Oct. 28, 1952 B. E. LENEHAN 2,615,984

SINGLE-TUBE FREQUENCY-MODULATED OSCILLATOR

Filed June 29, 1950

WITNESSES:

Robert A. Baird

Wm. Le Groome

INVENTOR

Bernard E. Lenehan.

BY O. B. Buchanan

ATTORNEY

Patented Oct. 28, 1952

2,615,984

UNITED STATES PATENT OFFICE 2,615,984

SINGLE-TUBE FREQUENCY-MODULATED OSCILLATOR

Bernard E. Lenehan, Bloomfield, N. J., assignor to Westinghouse Electric Corporation, East Pittsburgh, Pa., a corporation of Pennsylvania Application June 29, 1950, Serial No. 171,142

5 Claims. (Cl. 178—66)

Figure 1:
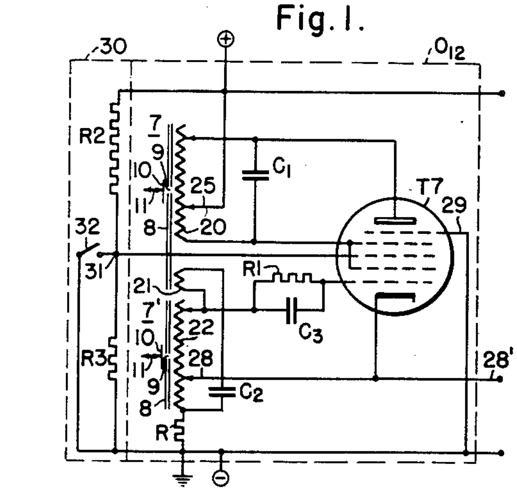

My invention relates to a single-tube frequency-modulated oscillator, and while it has particular reference to an oscillator which was designed to oscillate at a shiftable audible tone-frequency, it is also applicable to shiftable-frequency oscillators in the radio-frequency or carrier-current range. As a shiftable-frequency audio-tone oscillator, my invention relates to the transmitter-control part of a carrier-current system having a tone of a variable frequency superimposed upon the carrier wave, preferably by amplitude-modulation of the carrier, although the carrier could be frequency-modulated.

The word carrier is here used as indicative of any high-frequency currents which are used as a carrier for transmitting a superimposed tone-signal having a much lower frequency than the carrier. The carrier current may be either a radio-frequency current which is superimposed upon one of the line-conductors of a transmission-line, or an ultra-high-frequency microwave current which is beamed to a remote terminal of a transmission system by means of a directional antenna located at the relaying station or line-terminal, or any other kind of carrier wave which is used in any kind of communication system.

Heretofore, the use of tone-signals has been considered for relaying purposes, but the time-delays which are involved have been such as to make the direct keying of the tone-transmitter too slow for many relaying purposes. It requires about five cycles of the tone-frequency, after keying-on a tone, to build up the magnitude of the tone to a usable value. After turning off the tone-transmitter, it requires about ten cycles of the tone-frequency for the tone to die out. With my frequency-shifting system, it requires only about two cycles of the tone-frequency to shift from one tone-frequency to a distinguishably different tone-frequency.

More particularly, my invention relates to a novel energizing-connection for a pentagrid converter-tube, so as to make its third grid or control-grid determine the tuning of the tuned circuits of the oscillator, thus controlling the oscillation-frequency. The pentagrid converter thus operates as a reactance-modulator for injecting a reactive component of current into the tuned circuit of the oscillator.

The basic idea of my invention is predicated upon the fact that, in a pentagrid-converter type of tube, the transconductance between the grid No. 1 and the screen, and the transconductance between said grid No. 1 and the plate, are changed in opposite directions by changing the bias of the control-grid or grid No. 3.

In using my invention, I use a tuner transformer or other means having coupled tuned primary and secondary circuits. The primary circuit is connected between the screen and the plate of the converter tube, and the positive plate source is connected to an intermediate tapped point on the primary winding. The secondary winding is connected between the No. 1 grid and the negative supply-terminal, and the cathode-circuit of the tube is connected to an intermediate tapped point on the secondary winding. A variable control-voltage is applied to the No. 3 grid, thus changing the tuning as will be subsequently described.

Figure 2:
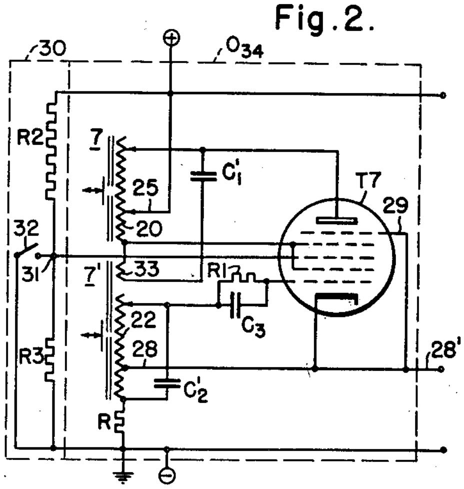
Figure 3:
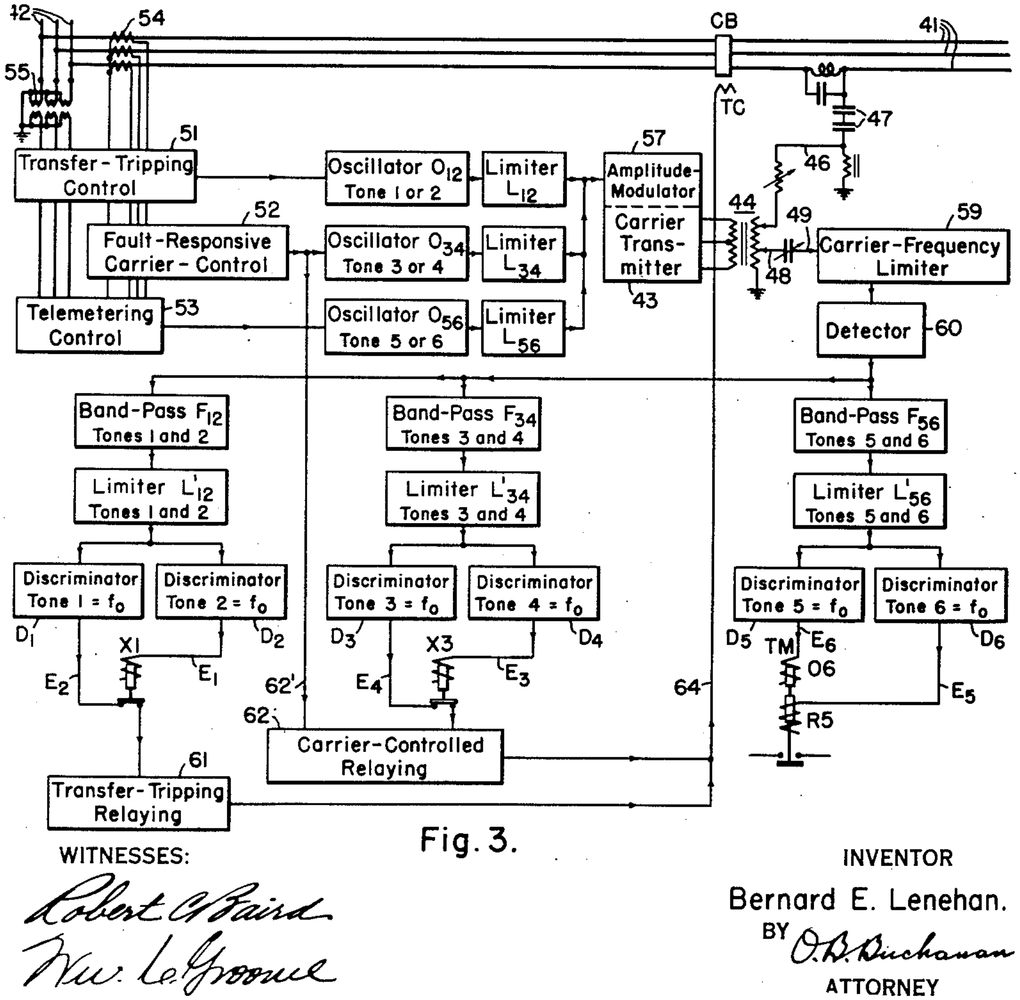

With the foregoing and other objectives in mind, my invention consists in the circuits, systems, combinations, apparatus, parts, and methods of design and use, hereinafter described and claimed, and illustrated in the accompanying drawing, wherein:

Figure 1 is a wiring diagram showing preferred exemplary connections for a pentagrid oscillator using two coupled inductors or transformers having tuned primary and secondary circuits;

Fig. 2 is a similar view of an attractive illustrative form of connections, using circuits which can be used either in lieu of the connections shown for the converter of Fig. 1, or as the energizing-circuits for another converter, producing two additional frequencies, in addition to the operating frequencies of the system shown in Fig. 1; and Fig. 3 is a block diagram of circuits and apparatus illustrating a complete six-tone carrier-current system using my present invention.

In Figs. 1 and 2, I have diagrammatically indicated the use of two loosely coupled variable-gap iron-cored inductors or transformers 7 and 7′, of a type which is described and claimed in my copending application Serial No. 171,141, filed June 29, 1950. Each of said inductors or transformers has an iron core 8 having an air gap 9 therein, and the air gap is bridged by an adjustably spaced magnetizable plate 10 having means, as diagrammatically indicated at 11, for adjustably moving the plate 11 toward or away from the gapped portion of the iron core 8. This is a very convenient expedient for varying the inductance of the winding, and thus varying or adjusting the tuning of the inductor or transformer. It is more convenient and more economical, in some ways, than a variable tuning-capacitor, for adjusting the tuning of the primary and secondary circuits of the two coupled inductors or transformers 7 and 7′, particularly in the audio-frequency range. So far as my present invention is concerned, however, any kind of coupled tuned primary and secondary circuits could be used, the only essential being that the circuits should be tuned, and that there should be coupling between them.

In Fig. 1, I have shown a grid-control panel 30, and an oscillator panel $O_{12}$, the subscript 12 being used to indicate that the oscillator is capable of oscillating to produce either a tone 1 or a tone 2, or either a frequency $f_1$ or a frequency $f_2$.

The oscillator $O_{12}$ uses a pentagrid converter tube T7 which is energized from the loosely coupled inductors or transformers 7 and 7', the first inductor 7 having a primary winding 20 and a tertiary winding 21, wound on its adjustable-gap iron core 8, while the second inductor 7' has a secondary winding 22 which is wound on its adjustable-gap iron core 8. The primary winding 20, or an adjustably tapped portion thereof, is a part of a tuned primary circuit comprising a tuning-capacitor $C_1$, which is connected across the primary-winding terminals, and these primary winding terminals are connected between the plate and the screen of the pentagrid tube T7, as shown in Fig. 1, the screen being the grids Nos. 2 and 4, connected together. The primary winding 20 has an intermediate tapped point 25 which is connected to the positive bus (+).

The secondary winding 22, or a tapped portion thereof, is connected between the No. 1 grid and a resistor R which is connected to the grounded negative bus (−). The secondary winding 22 is coupled to the primary winding 20 by being a part of a tuned secondary circuit which includes said secondary winding 22, the tertiary winding 21, and a tuning-capacitor $C_2$. The cathode circuit of the tube T7 is connected to an intermediate tapped point 28 of the secondary winding 22, and this tapped-point connection also serves as the output-circuit 28' of the oscillator $O_{12}$.

Included in the grid-circuit connections of the No. 1 grid, is a grid resistor R1, which is shunted by a capacitor $C_3$.

The shell or suppressor grid, or grid No. 5 of the tube, is connected at 29, either to the cathode circuit 28 of the tube or to the grounded negative terminal (−). In Fig. 1, this suppressor-circuit 29 is connected to the negative bus (−); while in Fig. 2 it is connected to the cathode circuit 28.

The No. 3 grid, or control-grid of the tube T7 is variably biased by means of a control-circuit or apparatus 30 which is capable of changing the direct-current bias-voltage which is applied to this grid. In Fig. 1, this grid-control apparatus is simply shown, in diagrammatic fashion, by connecting the No. 3 grid to an intermediate point 31 between two serially connected resistors R2 and R3 which are connected between the positive and negative buses (+) and (−). The resistor R3, which is connected to the negative bus (−), may be shunted by means of a switching device 32, which changes the grid-voltage from one value to another, as may be required for producing the desired frequency-shifting, as will be subsequently described.

In Fig. 2, I have shown a combination including the same grid-controlling apparatus 30 and a somewhat different oscillator-panel $O_{34}$, where the subscript 34 indicates that the oscillator may produce either tone 3 or tone 4, or either frequency $f_3$ or $f_4$. The oscillator $O_{34}$ of Fig. 2 uses the same pentagrid converter tube T7 as in Fig. 1, with essentially the same connections, except that the suppressor circuit 29' is connected to the cathode circuit 28. However, the transformers and the transformer-connections are somewhat different in Fig. 2, by reason of the fact that the first transformer or inductor 7 is not provided with the tertiary winding 21, while the second transformer 7' is provided also with a tertiary winding 33, which is connected in series with the primary winding 20 and tuning capacitor $C_1'$.

In Fig. 3 I have indicated, by block diagram, an illustrative system in which may invention can be used or applied. In any tone-signal or frequency-signal system, where the transmission of intelligence is dependent upon the transmission or non-transmission of one or two selected frequencies, whether audio-frequency tones, or supersonic tones or radio frequencies, it is practically always true that there will be other information-transmitting channels using other selected tones or frequencies in the adjacent spectrum. This will be true, whether the selected tone or frequency is superimposed on a carrier wave, or transmitted by itself. There are also various kinds of intelligence which are to be transmitted, including printing telegraph systems, as well as the kind of intelligence-transmitting system which is associated with the operation of alternating-current power-transmitting systems for which my invention was primarily designed. By way of illustration, therefore, I have chosen to represent a system, using my invention, which is adapted to the needs of power-line operation, with the understanding, however, that my invention is not limited to this particular field of application.

In Fig. 3, therefore, I have shown a three-phase transmission-line section 41 which is connected to a station-bus 42 through a circuit breaker CB having a trip coil TC. Various types of intelligence need to be transmitted from one station to another, during the successful operation of the line 41. Such information can be transmitted through various kinds of communicating channels, such as a radio-frequency carrier-wave which is superimposed upon the power-line 41, pilot wires owned by the power company, telephone or telegraph wires or channels leased by the power company, or directional radio or microwaves which are not guided by the power-line conductors.

I have chosen to illustrate, in Fig. 3, a communicating channel consisting of a carrier wave which is produced by a carrier transmitter 43, and which is coupled, by a transformer 44, to one of the phase-conductors of the power-line 41, through a tuned circuit 46 and coupling capacitors 47. At the same station, there will generally be carrier-receiving apparatus, which may be connected onto a tapped point 48 in the coupling-transformer 44, through a tuned receiver-circuit 49. As the same equipment is, or may be, used at both ends of the protected line-section 41, I have illustrated only one end or line-terminal, with the understanding that the other terminals may be duplicates of the illustrated terminal, except possibly for the tone-frequencies which are used.

In Fig. 3, I have illustrated, by block diagrams, three typical kinds of information which have to be transmitted, at times, from one end of the protected line-section to the other, during the successful operation of the line, and for protecting the line against faults. Thus the block 51 indicates a transfer-tripping control-apparatus, which determines, from information available at the relaying station in question, that a fault exists within the protected line-section 41, and that it is necessary to transfer or transmit this information to the remote terminal of the protected line-section, in order to trip the circuit breaker which is located at said remote terminal.

I have also illustrated a fault-responsive carrier-control apparatus 52, in which information which is received, by carrier, from the remote terminal of the protected line-section is compared with the information obtainable at the relaying station, for the purpose of determining whether any given fault on the transmission-system is located within the confines of the protected line-section 41.

I have also illustrated a telemetering control-apparatus 53, whereby information concerning the generating conditions and the load-distribution at the relaying station can be transmitted to a load-dispatcher at some other point in the transmission system, or whereby the dispatcher at the relaying station can operate automatic load-control equipment at some remote station.

As various means are known, for these three types of carrier-controlling apparatus, they are indicated only by block-diagram, as being under the control of a set of line-current transformers 54 and potential transformers 55.

Two tones or frequencies are assigned to each carrier-control apparatus, thus making a spectrum of six tones or frequencies which are involved in the transmission of three kinds of intelligence, as in the particular communication-system which is shown in Fig. 3. Thus, the transfer-tripping control-apparatus 51 controls an oscillator $O_{12}$ which is continuously oscillating to produce either tone 1 or tone 2, or either the frequency $f_1$ or the frequency $f_2$, shifting from one tone to the other, under the control of the transfer-tripping control-apparatus 51. The output of this oscillator $O_{12}$ is shown as being next passed through a limiter or wave-shaper $L_{12}$, and thence on into the modulator-part 57 of the carrier-current transmitter 43. The carrier-current modulation may be either amplitude-modulation or frequency-modulation. At present, amplitude-modulation is the preferred kind, and I have so indicated, in the diagrammatic representation of the modulator 57.

In like manner, the fault-responsive carrier-control apparatus 52 controls a tone-oscillator $O_{34}$, which produces either tone 3 or tone 4, having either the frequency $f_3$ or $f_4$, according to the control which it receives; and this oscillator $O_{34}$ is connected to the amplitude-modulator 57 through its own limiter $L_{34}$. In the same way, the telemetering-control apparatus 53 controls its oscillator $O_{56}$, producing tone 5 or tone 6, having the frequency $f_5$ or $f_6$, transmitting the same, through its limiter $L_{56}$, to the modulator 57.

The carrier-receiving equipment, in Fig. 3, is illustrated as including, first, a carrier-frequency limiter 59, which is coupled to the tuned receiver-circuit 49, and which limits the amplitude of the carrier-wave which is passed on to the sensitive detector 60, so that the detector will not be damaged by the high-amplitude carrier-wave which is received from the local transmitter 43.

The detector 60 has an output which contains all of the tone-frequencies which are included in the received carrier wave. This detector-output is passed on to three band-pass filters $F_{12}$, $F_{34}$ and $F_{56}$, each of which is designed to pass only the two adjacent tones, in the tone-spectrum, to which its apparatus is intended to be selectively responsive. While I have used the same numbers to designate the tone in the receiving apparatus, as in designating the tones in the corresponding transmitter-controlling apparatus, it is to be understood that the receiving apparatus is designed to respond to certain tones which are transmitted from the other line-terminal, which is not illustrated, while the transmitter-controlling tones are intended to actuate the receiving apparatus at the remote line-terminal. In most cases, a different set of tones is used in the transmitter-controlling apparatus at each station or line-terminal, in order that separate information may be transmitted both ways, without interference. This is not necessarily so, however. At any rate, it should be understood that the tones which are referred to, in describing the receiving apparatus, are the tones which are used in controlling the transmitter at the other end of the protected line-section 41.

The output of the three band-pass filters $F_{12}$, $F_{34}$ and $F_{56}$ are first passed through their respective limiters or amplitude-limited amplifiers $L_{12}'$, $L_{34}'$ and $L_{56}'$, which bring up the respective pairs of tones, if they are present in sufficient volume, to a substantially fixed amplitude, regardless of fluctuations in attenuation during the course of transmission.

The constant-amplitude tones which are produced by the respective limiters $L_{12}'$, $L_{34}'$ and $L_{56}'$ are next passed on to suitable discriminators which have a separate output-circuit for producing direct-current voltages which are selectively varied in response to each of the received tones, respectively. Any sort of discriminator-apparatus or arrangement, which will accomplish such a function, may be used, so far as the workings of the system as a whole are concerned. I have indicated separate discriminators $D_1$, $D_2$, $D_3$, $D_4$, $D_5$ and $D_6$, one for each tone, where the subscript designates the number of the tone to which the resonant-frequency $f_0$ of the discriminator is tuned, but I intend such illustration to be indicative, broadly, of the use of any sort of discriminator-means for distinguishing between the frequencies of the pair of tones which are used in each of the intelligence-transmitting channels.

The limiter $L_{12}'$ is shown as feeding the discriminators $D_1$ and $D_2$, while the limiter $L_{34}'$ feeds the discriminators $D_3$ and $D_4$, and the limiter $L_{56}'$ feeds the discriminators $D_5$ and $D_6$. Thus, each of the six discriminators is impressed with input-currents having either one or both of two tone-frequencies. Each discriminator produces no (significant) voltage in response to an input-tone having the same frequency as its resonant-frequency $f_0$. Hence each discriminator produces a (significant) direct-current output-voltage only in response to the other one of the two input-frequencies with which it is supplied. Thus, the discriminator $D_1$ produces an output-voltage $E_2$ which is responsive to the received tone 2, while the discriminator $D_2$ produces an output voltage $E_1$ which is responsive only to the receiver tone 1. In like manner, the discriminators $D_3$, $D_4$, $D_5$ and $D_6$ produce the output voltages $E_4$, $E_3$, $E_6$ and $E_5$, each of which is responsive only to the receiver tone designated by its subscript.

There are thus produced two discriminator-voltages for each of the types of information which are to be received by the receiving equipment illustrated in Fig. 3. In each case, it is assumed that the corresponding transmitter-controlling apparatus at the remote station is normally continuously producing the lower-numbered of the two tones which are assigned to the transmission of that particular class of intelligence, and it is assumed that the intelligence is transmitted by shifting the tone, of that pair, and back again, in accordance with the transmitter-controlling apparatus.

In the particular system shown in Fig. 3, the first, or lower-numbered, tone of each pair is used, in the receiving apparatus, as a signal-restraining or preventing means, while the other tone of that pair is used as the signal-operating means, the restraint being so strong or so effective that a signalling operation is not obtained if both of the tones should be received or detected simultaneously. It is obvious that various means could be used whereby this sort of receiver-operation could be obtained, whereby an operation is produced only if a second tone is received in the absence of a first tone. It is intended, therefore, that the illustration in Fig. 3 be regarded as a diagrammatic illustration representative of any receiver-means for effecting the broad objectives just explained.

In Fig. 3, the first pair of discriminators $D_1$ and $D_2$ are used to control a transfer-tripping relaying-apparatus 61. Thus, the tone 2 discriminator-voltage $E_2$ is fed into the transfer-tripping relaying-apparatus 61 through the back contact X1 of a relay X1, the operating coil of which is energized by the discriminator-voltage $E_1$ which is produced when tone 1 is being transmitted.

The second pair of discriminators $D_3$ and $D_4$ are similarly used to control a carrier-controlled relaying-apparatus 62. The discriminator-voltage $E_4$, which is responsive to the second tone 4 of that pair, is supplied to said carrier-controlled relaying-apparatus 62, through the back-contact X3 of a relay X3 which is energized by the discriminator-voltage $E_3$ which is responsive to the tone 3 of the pair. The carrier-controlled relaying-apparatus 62 is shown as having a second input or control-line 62' which is energized from the output of the local fault-responsive carrier-controlling apparatus 52, so that the carrier-controlled relaying-apparatus 62 can comparatively respond to both local line-conditions and remote-end line-conditions at the other terminal of the protected line-section 41.

The third pair of discriminators $D_5$ and $D_6$, in Fig. 3, are shown, by way of illustration, as controlling a differential type of telemetering receiver-relay TM, which has an operating coil O6 which is energized from the discriminator-voltage $E_6$ in response to the second tone 6 of that pair, and a restraining coil R5 which is energized from the discriminator-voltage $E_5$ which is responsive to the first tone 5 of that pair. It is understood, of course, that the differential type of relaying apparatus, which is shown at TM, could be replaced by the type of control which is used for the relaying equipments 61 and 62, or vice versa.

The transfer-tripping relaying-apparatus 61 and the carrier-controlled relaying-apparatus 62 are both used to control the energization of the trip coil TC of the local line-sectionalizing breaker CB, as shown by the diagrammatically indicated trip-circuit 64. The telemetering relay TM is used to control telemetering apparatus (not shown), which may be conventional.

An important advantage of the shifting-tone intelligence-transmitting equipment, as illustrated in Fig. 3, is that the same number of tones are always being transmitted by the communication-system, whether that transmission be by way of separate tone-frequencies which are being modulated onto a carrier wave, or whether said transmission be by way of separate independent tone-frequencies or radio-frequencies which are transmitted by themselves, without being superimposed upon a higher-frequency carrier-wave. Each tone, which is used, out of an available sequence or spectrum of tones or frequencies, necessarily causes some interference with other tones of the same spectrum or series. This is inevitable, notwithstanding the fact that various precautions are used, such as by way of the limiters or wave-shapers $L_{12}$, $L_{34}$ and $L_{56}$ in the transmission-control. Such interference will tend to cause false tone-transmission, and hence false tone-reception; and that interference may load a receiver until said receiver cannot discriminate between tone and no-tone conditions.

The intelligence-communicating system, shown in Fig. 3, eliminates this tone-interference trouble by leaving each tone-transmitter $O_{12}$, $O_{34}$ and $O_{56}$ connected, and operating, at all times. Each tone-transmitter thus "loads" the other tone-transmitters, or produces side-band tones having the same frequencies as the other tone-transmitters, but this loading now becomes constant, because the tones are always there, and hence such a loading becomes negligible, because the receiving apparatus can be adjusted to discriminate against such constant interference. This system is broadly covered in my previously-mentioned copending application.

In the intelligence-communicating system which is shown in Fig. 3, a proper discrimination between tone and no-tone conditions is also achieved through the use of a type of receiving apparatus which responds to one tone, and is restrained or locked out by another tone. This sort of safeguard is particularly advantageous in protecting the apparatus against the sort of interference which comes from transients of various kinds. Generally, a transient which will generate one frequency will generate a wide band of frequencies in that vicinity, thus producing both tones of each pair of tones which are differentially used in the illustrated tone-receiving apparatus, the apparatus being so designed that it will not respond, if both tones are received at the same time. This restraining-tone receiver-system is broadly covered in an application of J. D. Moynihan, Serial No. 171,192, filed June 29, 1951.

The present invention relates to an improved type of shifting-frequency oscillator, two examples of which are shown in Figs. 1 and 2, which may be regarded as details of the oscillators $O_{12}$ and $O_{34}$ of Fig. 3, for example. My improved oscillator is just as simple as previously known oscillators, and it has the advantage of electronically changing or shifting its tuning by means of a grid-control circuit which operates in response to voltage-changes, without drawing any material amount of current.

In the operation of the oscillator which is shown in Fig. 1, for example, the primary and secondary transformer-coils 20 and 22 are coupled together, and each is tuned to the center frequency of the two frequencies between which the oscillator is to be shifted. A 90° relationship exists between the transformer-voltages which appear in the two coils 20 and 22. However, currents are supplied to these coils from the pentagrid tube T7, and these tube-supplied currents are all in phase (or phase-opposition) with the tone-frequency voltage which appears on grid No. 1, which is connected to the top of the lower coil 22. The effect is, that the sum of the screen and plate currents flows through this coil 22 to maintain oscillation by supplying a negative resistance. The plate current flows through a fraction $k$ of the top coil 20, depending upon the tap-location 25, while the screen current flows in the opposite direction of the remaining fraction $(1-k)$ of the top coil 20. The effect of the differentially flowing plate and screen currents in the top coil 20 produces a 90° shifted voltage-component in the lower coil 22, which thus appears as a variable reactance which changes the tuning. This tuning-change, in the lower coil 22, is reflected back, by reason of the inductive coupling, into the top coil 20, so as to change the tuning of both coils. Tests have shown, for example, than an oscillator which is tuned for a center frequency of 209 cycles can be adjusted approximately from 180 to 240 cycles, by varying the voltage of the control grid No. 3.

The magntiude of the frequency-shift which is obtained by the above-described means is controlled by the proper choice of the two grid-voltages which are applied to the control-grid No. 3, by the circuit 31 from the potentiometer-resistances R2 and R3, under the control of the potential-shifting contact 32.

The oscillator can also be shifted in frequency, continuously between its limits, in response to a varying signal, if desired.

The operation of the oscillator shown in Fig. 2 is essentially the same as that shown in Fig. 1, the only difference being in the details of the tuned circuit containing the transformer-coil 22.

While I have illustrated my invention, and indicated its principles of design, operation and application, with several examples, I wish it to be understood that my invention is susceptible of considerable modification, by way of substituting equivalents, or omitting or adding various parts and refinements, without departing from the essential spirit of the invention. I desire, therefore, that the appended claims shall be accorded the broadest construction consistent with their language.

I claim as my invention:

1. An oscillator comprising: a tube having a plate, a cathode, and at least five grids therebetween, of which the grids Nos. 2 and 4 together constitute a screen-grid; inductive means including a tuned primary circuit and a tuned secondary circuit having a loose inductive coupling therebetween, the primary tuned circuit including a primary winding having an intermediate tapped point, and the secondary tuned circuit including a secondary winding having an intermediate tapped point; a plate-source having positive and negative terminals; means for connecting the primary winding between the plate and the screen of the tube; means for connecting the positive source-terminal to the intermediate tapped point of the primary winding; means for connecting the secondary winding between the No. 1 grid and the negative source-terminal; means for connecting the cathode to the intermediate tapped point of the secondary winding; means for connecting the No. 5 grid to a potential close enough to the cathode-potential to make that grid operate as a suppressor-grid; means for applying a direct-current bias-voltage to the No. 3 grid; and means for varying said bias-voltage between such limits as to cause the oscillator frequency to vary from one frequency to a distinguishably different frequency.

2. A frequency-shift transmitter including an oscillator as defined in claim 1, and signalling controller-means acting on the bias-varying means of said oscillator to control the output frequency of the transmitter.

3. A frequency-shift tone-signal carrier-current transmitter, comprising a shiftable-frequency tone-frequency modulator for continuously superimposing a tone-frequency modulation on the carrier current, said tone-frequency being much lower than the carrier frequency, said modulator including an oscillator as defined in claim 1, and signalling controller-means acting on the bias-varying means of said oscillator to control the output frequency of the transmitter.

4. A multi-channel frequency-shifting tone-signal transmitter-system comprising a continuously transmitting carrier-current transmitter, a plurality of shiftable-frequency tone-frequency modulators, each continuously superimposing a distinctive tone-frequency modulation on the carrier current, said tone-frequencies being much lower than the carrier frequency, each modulator including an oscillator as defined in claim 1, and separate signalling controller-means acting on the bias-varying means of each oscillator to control its output frequency.

5. An oscillator comprising: a pentagrid converter type tube, inductively coupled primary and secondary windings each having an intermediate tapped point, positive and negative terminals adapted for connection to a power supply, means for connecting said primary winding between the anode and the screen grid of said tube, means for connecting said positive terminal to said intermediate tapped point of the primary winding, means for connecting said secondary winding between the Number 1 grid of said tube and said negative terminal, means for connecting the cathode of said tube to the intermediate tapped point of said secondary winding, impedance connected between said Number 3 grid and said negative terminal, means adapted to connect a source of voltage in circuit with said impedance, and means for varying said impedance between such limits as to cause the oscillator frequency to vary from one frequency to a distinguishably different frequency.

BERNARD E. LENEHAN.

REFERENCES CITED

The following references are of record in the file of this patent:

UNITED STATES PATENTS

| Number | Name | Date |
|---|---|---|
| 2,282,102 | Tunick | May 5, 1942 |
| 2,513,910 | Bliss | July 4, 1950 |